Oct. 25, 1955
J. L. SCHAD
2,721,788
DECOMPOSITION OF HYDROGEN PEROXIDE
Filed Aug. 25, 1950
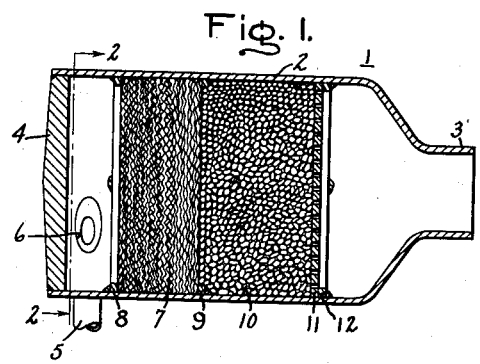
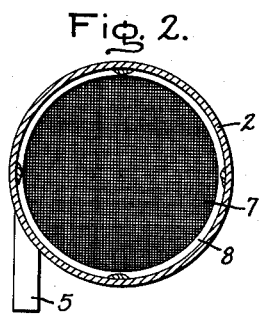
Inventor:
James L. Schad,
by Claude A. Mets.
His Attorney.

United States Patent Office 2,721,788
Patented Oct. 25, 1955

2,721,788
DECOMPOSITION OF HYDROGEN PEROXIDE

James L. Schad, Redondo Beach, Calif., assignor to General Electric Company, a corporation of New York Application August 25, 1950, Serial No. 181,453

1 Claim. (Cl. 23—281)

This invention relates to gas generators. More particularly, it relates to improved means for decomposing hydrogen peroxide into gaseous components.

In certain applications, such as in jet propulsion devices, of which rockets are an example, steam used to drive turbopumps for pumping reactants is often supplied by the decomposition of hydrogen peroxide under catalytic action. The production of steam by such means is particularly advantageous in that the generator used takes up very little space and weight in the rocket or other jet propulsion device where space and weight is at a premium.

Typically, the hydrogen peroxide gas generator for producing steam may be in the form of a hollow cylinder having inlet means for the liquid concentrated hydrogen peroxide at one end, a gaseous products outlet at the other end and, in between, the catalyst used to decompose the hydrogen peroxide.

Catalytic agents which may be used include calcium permanganate, sodium permanganate, manganese dioxide, potassium permanganate, iron oxide, and platinum. Preferably, the catalysts are in the form of films on bits or pieces of ceramic material or on wire screens.

The concentrated liquid hydrogen peroxide has heretofore been introduced into the catalyst chamber in a number of different ways. One method has been to simply introduce the liquid through a conduit and a multi-holed distribution plate into the catalyst mass in a direction along the longitudinal axis of the chamber. While the distribution plate with its many small holes serves the purpose of introducing the liquid hydrogen peroxide more or less evenly over the entire upstream cross-section of the catalyst mass, the pressure drop and, hence, energy loss necessary to produce such result is excessively high. In addition, the rather high initial downstream velocity imparted to the fluid as it issues from the holes causes the liquid to flow through the catalytic mass or screens at such a high rate of speed that the conversion to gaseous products tends to be undesirably low. As a result, the issuing gases contain a large amount of unconverted hydrogen peroxide and much available energy is lost.

In another type of gas generator, the concentrated liquid hydrogen peroxide is simply sprayed against the catalyst mass from a spray nozzle. Again the initial high velocity imparted to the liquid causes it to pass through the mass too quickly for efficient decomposition. Here, too, the pressure drop through the nozzle represents an undesirable energy loss.

It is an object of the present invention to provide a device for the decomposition of hydrogen peroxide which is characterized by low energy loss or pressure drop of the entrant liquid hydrogen peroxide.

Another object of this invention is to provide a generator for producing steam and oxygen from the catalytic decomposition of liquid hydrogen peroxide in which more intimate and complete contact with the catalyst is achieved.

A still further object of the invention is to provide means for the decomposition of liquid hydrogen peroxide in which the velocity of the hydrogen peroxide through the catalytic mass is substantially reduced.

Another object of this invention is to provide a generator for the decomposition of liquid hydrogen peroxide in which enhanced decomposition of the hydrogen peroxide is achieved in a relatively small space.

Other objects will become apparent from a consideration of the following description and the drawing in which Fig. 1 is a side elevation, cross-sectional view of a hydrogen peroxide decomposer embodying the present invention and Fig. 2 is a cross-sectional view of the decomposer taken in the direction 2—2.

It has been found that an improved device for the decomposition of liquid concentrated hydrogen peroxide may be very easily constructed.

More particularly, it has been found that such an improved device may be provided by feeding the liquid concentrated hydrogen peroxide into the cylindrical chamber tangential to the inner periphery of the chamber. By means of such an entry, there is imparted to the liquid a circular swirling motion having no initial velocity along the axis of the catalyst chamber. As liquid is fed tangentially in the above-described manner, it moves downstream toward and through the catalytic agent with a swirling turbulent motion which produces a more complete, uniform, and thorough contact with the catalyst than when the liquid is fed axially into the chamber. The decomposition of the hydrogen peroxide also proceeds more smoothly and to a higher degree of completion than with prior feed arrangements.

The present means of introducing the liquid hydrogen peroxide into the catalyst chamber, being practically unrestricted, produces essentially no pressure drop and produces a saving in energy over the prior art structures in which the liquid is fed axially into the chamber through nozzle means or through a conduit and distribution plate.

For a more complete understanding of the invention, attention is invited to the drawing. The generator or reactor 1 has an outer metal shell 2, preferably of stainless steel, which is constricted at the gas outlet end 3; the other end being closed by a metal plate 4 which is welded in place. In practice, any non-reacting metal may be used which is structurally strong at the operating temperatures and pressures which are of the order of 1300° F., due to the exothermic decomposition process, and 500 pounds per square inch respectively. The liquid feed conduit 5 is mounted in hole 6 in casing 2, its discharge being directed tangentially along the inner periphery of the reactor so that liquid fed through it will swirl in a circular fashion around the inner periphery of the chamber. A catalyst mass 7, which serves to initiate decomposition of the hydrogen peroxide passing through it, is shown in the present instance as consisting of a series of closely packed fine mesh screens which are catalyst treated held in place downstream of the liquid inlet by retainer rings 8 and 9 which may be welded or otherwise fixed to casing 2. To insure more complete decomposition of the hydrogen peroxide, additional reactant surface is provided downstream of the catalyst mass 7 by a mass of catalyst-coated ceramic or vitreous particles or fragments 10. Alternatively, the entire catalytic mass may consist of coated screens or ceramic particles. The gaseous steam and oxygen products of the decomposed hydrogen peroxide pass through perforated plate 11 held in place by ring 12, which serves to retain the ceramic particles 10 in place and exit from the generator through duct 3 to the turbopump or other mechanism which is to be driven.

Using the present decomposed having typically a total length of 8 inches and a maximum inner diameter of 4 inches, as much as 4.5 pounds per second of concentrated 90% liquid hydrogen peroxide at 480 pounds per square inch pressure has been decomposed into gaseous components at 1325° F. producing about 2000 jet kinetic horsepower. The pressure drop due to the present injection system is practically nil as compared to about 60 pounds per square inch using a nozzle or a distribution plate as described above and used heretofore. The only pressure drop experienced in the present device is that attributable to the catalytic mass. In an installation such as that shown, having 35 screens and about a two-inch depth of ceramic saddle-shaped packing, the total pressure drop, due only to the catalyst mass, is about 40–50 pounds per square inch.

The tangential liquid hydrogen peroxide feed also affords a more uniform distribution of the liquid through the catalyst bed and smoother decomposition than in decomposers using a spray or nozzle-distribution plate feed. For example, about 94% of the liquid hydrogen peroxide introduced is decomposed using the present reactor. On the other hand, axial introduction of the hydrogen peroxide through a conduit and distribution plate gives only about 88% decomposition, while an axially directed spray nozzle affords only about 92% decomposition.

The increased efficiency of hydrogen peroxide decomposition made possible by the use of the present invention permits the use of the weight and space saved thereby for extra fuel to increase the range of the missile or for the accommodation of a larger payload. The saving in weight and space and its utilization for fuel or payload is a primary factor in the design of jet-propelled vehicles.

What I claim as new and desire to secure by Letters Patent of the United States is:

A reactor for the catalytic decomposition of hydrogen peroxide into gaseous components for driving a turbopump or the like, said reactor comprising a cylindrical chamber having a closed end and an open outlet end, said outlet end being defined by a frusto-conical constriction, a hydrogen peroxide decomposition catalyst mass positioned in the central portion of said chamber, said mass comprising a plurality of catalytic screens placed upstream of a plurality of ceramic pellets, said mass positioned in the cylinder downstream of, and spaced from, the closed end so as to form a catalyst free cavity, a perforated plate positioned downstream from said catalyst mass, retainer rings welded to said cylinder wall, said retainer rings fixedly positioning said catalytic mass and perforated plate in said cylinder and being juxtapositioned thereto so as to prevent the leakage of hydrogen peroxide between the circumference of the catalyst mass and the cylinder during successive operations, said perforated plate being fixedly positioned adjacent to said frustoconical constriction by one of said retainer rings, an inlet conduit in said closed end for the hydrogen peroxide directed to force the fluid to impinge on the cylinder wall in said cavity, said cavity providing means for reducing the jet velocity from said inlet to provide uniform flow through the catalyst, said cavity, catalyst, perforated plate and constriction operating to produce a pressure drop through the reactor, said conduit inlet cavity and catalyst screens providing a means for maintaining a constant pressure drop through the reactor.

References Cited in the file of this patent

UNITED STATES PATENTS

| | | |
|---|---|---|
| 729,008 | Sutton et al. | May 26, 1903 |
| 729,009 | Sutton et al. | May 26, 1903 |
| 885,766 | De Laval | Apr. 28, 1908 |
| 1,814,796 | Grebe | July 14, 1931 |
| 2,025,402 | Saint-Jacques | Dec. 24, 1935 |
| 2,274,922 | Fischer | Mar. 3, 1942 |
| 2,320,149 | Lohausen | May 25, 1943 |
| 2,441,528 | Bender et al. | May 11, 1948 |
| 2,528,094 | Walker | Oct. 31, 1950 |

OTHER REFERENCES

Mellor: Comp. Treat. on Inorg. and Theo. Chem., 1922, vol. 1, page 353. Longmans, Green and Co., New York.

Journal of the Amer. Rocket Soc., No. 65, March 1946, page 26.